US007688715B2

(12) United States Patent
Lee et al.

(10) Patent No.: US 7,688,715 B2
(45) Date of Patent: Mar. 30, 2010

(54) APPARATUS FOR PROVIDING SHELF MANAGER HAVING DUPLICATE ETHERNET PORT IN ATCA SYSTEM

(75) Inventors: Sang Yeoun Lee, Daejeon (KR); Yong Tae Kim, Daejeon (KR); Kwang Suk Song, Daejeon (KR); Bong Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 432 days.

(21) Appl. No.: 11/595,752

(22) Filed: Nov. 9, 2006

(65) Prior Publication Data

US 2007/0104091 A1 May 10, 2007

(30) Foreign Application Priority Data

Nov. 10, 2005 (KR) ...................... 10-2005-0107559

(51) Int. Cl.
H04J 1/16 (2006.01)
H04L 12/28 (2006.01)
H04L 12/56 (2006.01)
G06F 15/16 (2006.01)
G06F 13/14 (2006.01)

(52) U.S. Cl. ........................ 370/218; 370/401; 370/410; 709/249; 710/305

(58) Field of Classification Search ....................... None
See application file for complete search history.

(56) References Cited

U.S. PATENT DOCUMENTS

| 2003/0058791 | A1* | 3/2003 | Soetemans et al. .......... 370/225 |
| 2003/0058800 | A1* | 3/2003 | Goodman et al. ........... 370/241 |
| 2004/0076160 | A1* | 4/2004 | Phaltankar ................ 370/395.1 |
| 2007/0038732 | A1* | 2/2007 | Chandwani et al. ......... 709/223 |

FOREIGN PATENT DOCUMENTS

KR 0173205 B1 10/1998

* cited by examiner

*Primary Examiner*—Daniel J Ryman
*Assistant Examiner*—Cassandra Decker
(74) *Attorney, Agent, or Firm*—Ladas & Parry LLP

(57) ABSTRACT

An apparatus for providing duplicated shelf managers in an ATCA system is provided. The apparatus for providing duplicated shelf managers includes a hub/switch in a control backplane to allow a manager to access the duplicated shelf managers all the time from an external network while maintaining the switch configuration defined of the ATCA specification. The hub/switch connects Ethernet ports of the duplicated two shelf managers and Ethernet ports of the two switches at the same time, and connects the two shelf managers and the two switches to the Internet.

11 Claims, 8 Drawing Sheets

APPARATUS FOR PROVIDING SHELF MANAGER HAVING DUPLICATE ETHERNET PORT IN ATCA SYSTEM

RELATED APPLICATION

The present application is based on, and claims priority from, Korean Application Number 2005-0107559, filed Nov. 10, 2005, the disclosure of which is hereby incorporated by reference herein in its entirety.

BACKGROUND OF THE INVENTION

1. Field of the Invention

The present invention relates to an advanced telecom computing architecture (ATCA) system, and more particularly, to an apparatus for providing a shelf manager having a duplicated Ethernet structure.

2. Description of the Related Art

The communication equipment industry has been seriously damaged due to the Internet Bubble collapse of early 2000. Manufacturers of communication equipment lost between millions and billions of dollars as a result of the market and several hundred thousands of employees lost their jobs due to downsizing. The manufacturers generally designed their own semiconductor devices exclusively for their products, and the manufacturers produced hardware, operating systems and applications according to the specially designed semiconductor devices. Such products were provided to communication service providers. Since the manufactures were damaged seriously, they had to find alternatives for manufacturing communication equipments.

The communication service providers generally design and manufacture their own network equipment to provide corresponding services. Such a way of producing network equipment is used to restrict competitors from entering the same market and also to maintain high service cost by limiting the compatibility of the network equipment. However, it is difficult for the communication service provider to manage various types of network equipment, although the cost of the initial installation of network can be reduced by competitive bidding.

In order to overcome such difficulties, many communication service providers introduced standardization of network equipment to increase the compatibility. For example, more than 40 world-wide companies have participated to standardize network equipment and an advanced telecom computing architecture (ATCA) platform was introduced accordingly.

The ATCA platform was designed of a reusable case, boards, switches, a central processing unit (CPU) and programmable network processors. The structure of the ATCA platform enables manufacturers of network equipment to produce network equipment according to the related standards thereof.

The ATCA platform enables the design of a network system according to the specifications of the PCI industrial computer manufacturers group (PICMG) standard. Therefore, the time of developing a network system is decreased and the economical efficiency increases.

The ATCA provides compatibility among different system manufacturers or various modules having different functions by defining an open standard hardware platform. Accordingly, the communication equipment manufacturers can concentrate on developing a target dedicated functional module, since the communication equipment manufactures are not required to develop all other functional parts of the communication equipment. Therefore, the development time of communication equipment is reduced, and the stability and the reliability of dedicated functional modules are secured. Furthermore, the development period of an entire communication system and the cost of developing the communication system are also reduced.

Furthermore, the ATCA allows the communication service provider to build a communication system using functional modules manufactured from different manufacturers. Therefore, the dependency on a manufacturer to manage an entire communication system is reduced, and the communication system can be constantly upgraded and managed efficiently using the standardized single platform for communication equipment.

Due to various advantages of the ATCA, the ATCA has been spotlighted as the major standard for communication systems, and more than 100 major communication system manufacturers and PICMG recently introduced PICMG 2.x ATCA specifications. The PICMG 2.x ATCA specifications were commonly used by many communication equipment manufacturers and communication service providers to develop their communication equipment.

FIG. 1 is a block diagram illustrating a structure of managing systems based on ATCA according to the related art.

Referring to FIG. 1, the ATCA based system management structure includes a plurality of ATCA boards 102 capable of transmitting data based on Internet protocol (IP), a power input module 107 for supplying power to the entire ATCA system, a fan tray 106 connected to the power input module 107 to drive a fan, duplicate shelf managers 101 for managing and controlling the plurality of ATCA boards 102, and intelligent protocol management controllers (IPMC) for connecting the shelf managers 101, the plurality of ATCA boards 102 and the fan tray 106.

The plurality of ATCA boards 102 and the fan tray 106 must include an intelligent protocol management controller 103 (IPMC) for controlling predetermined functions, power supply for a board, a sensor and a port connected to a back plane. The duplicated shelf managers 101 manage and control the plurality of ATCA boards 102 through the IPMCs 103 connected to an IPMB bus 104.

The ATCA system essentially supports a hardware management function based on the intelligent platform management interface (IPMI). A shelf-external system manager 105 provides a hardware managing function of the system to a manager and is accessed through an external network using a simple network management protocol (SNMP), an IPMI over RMCP (Remote Mail Checking Protocol), a command line interface (CLI) and a Web interface, which are supported by the shelf manager 101.

The current ATCA specification mostly defines functions of hardware and shelf manager 101 and generally defines various data backplane structures according to the structure of a switch slot, such as a pull mesh or a dual-star.

FIG. 2 is a view for describing the topology of backplane specifications of a general ATCA.

The backplane defined by the current released ATCA is divided into three regions, Zone 1 to Zone 3, to manage power distribution, system management and data transmission and I/O interface.

The first region, Zone 1, performs the system management and the power distribution by transferring a power management signal and a low-speed data management signal to each slot. The Zone 1 is connected to all of slots 21 and 22 in series as shown in reference numeral 200 of FIG. 2.

The second region, Zone 2, performs the high-speed data exchange among boards. The Zone 2 includes a base interface 201 configured in a dual-star topology for providing additional paths to the entire backplane and for allowing various devices at a node slot 22 to exchange control information, a fabric interface 202 configured in a pull mesh topology for setting slots to be directly connected to one another to allow the slots to exchange packet data, a channel update interface 203 for connecting adjacent boards to allow independent communication therebetween in order to enable closely-coupled devices to exchange state information thereof, and a clock interface 204 for providing a redundant clock set to each board of a synchronized timing application.

The third region, Zone 3 (not shown), is used to route a signal. The connection structure for Zone 3 is not currently defined. The third region is left to the board vendor according to the application.

Such a data backplane structure is applied to a center switch slot 21 and side node slots 22. As shown in FIG. 2, the switch slot 21 occupies two center slots and is connected to each of the node slots 22 through the base interface 201. The fabric interface 202 has a structure identical to the switch slot 21 and the node slots 22 even in the base interface 201. Also, a first base interface (Shmc) of a duplicated switch slot 21 (switch) is defined to connect to an Ethernet port of a shelf manager 101 in all data backplane structure.

Although FIG. 2 shows a data backplane only, the shelf manager of ATCA system includes another backplane, a control backplane. The control backplane provides a slot for packaging the shelf manager 101 and the fan tray 106. Such a control backplane may further include an alarm board.

The control backplane may have various structures. Generally, the control backplane is used to connect the Ethernet port of the shelf manager 101 and the IPMB bus 104 to the data backplane.

Two Ethernet ports are provided to the shelf manger 101. The structure of the Ethernet port of the shelf manager 101 for duplication is classified into two structures.

In a first structure, a first Ethernet port (Eth0) is used to allow a manager access and a second Ethernet port (Eth1) is used for connecting duplicate shelf managers 101. That is, the second Ethernet port (Ethe1) is connected to a second Ethernet port of the other shelf manager through the control backplane. Therefore, the first Ethernet port (Eth0) is connected to a first base interface (Shmc) of a switch slot through a control backplane or is connected to a RJ-45 of a shelf manager. Therefore, a manager is allowed to select one of the two ports.

FIG. 3 is a block diagram showing an Ethernet port connection between shelf managers and two switch boards in a switch slot (21) in a conventional ATCA system according to a first embodiment of the related art.

Referring to FIG. 3, reference numerals 31 and 32 denote a first switch and a second switch respectively, and reference numerals 101-1 and 101-2 denote respectively a first shelf manager and a second shelf manager having a duplicate structure.

As shown, each of the first shelf manager 101-1 and the second shelf manager 101-2 has a first Ethernet port Eth0 301 or 303 and a second Ethernet port Eth1 302 or 304. The second Ethernet ports 302 and 304 are connected to one another for connecting the first shelf manger 101-1 and the second shelf manager 101-2. The first Ethernet ports 301 and 303 are connected to the base interfaces (Shmc) 305 and 306 of the first and the second switch 31 and 32 at the switch slot 21.

Such a connection structure allows a manager to always access the active one of the first and the second shelf mangers 101-1 and 101-2 from an external network through the base interfaces (Shmc) 305 and 306 of the first and the second switch 31 and 32 when the base interfaces (Shmc) 305 and 306 of the first and the second switch 31 and 32 are operated normally. A solid line in FIG. 3 denotes that the connection is established.

However, the manager cannot access the first shelf manager 101-1 that is in an active state from an external network if the base interface (Shmc) 306 of the second switch 32 is not operated in a switch system having a duplicate switch structure or if a switch system has a single switch structure.

FIG. 4 is a block diagram showing an Ethernet connection between shelf managers and two switch boards in a switch slot 21 according to the first embodiment when a manager cannot access the shelf manager.

Referring to FIG. 4, a duplicated structure of a first shelf manager 101-1 and a second shelf manager 101-2 have first and second Ethernet ports 401 to 404, respectively. The second Ethernet ports 402 and 404 connect the first and the second shelf managers 101-1 and 101-2, and the first Ethernet switches 401 and 403 are connected to the first and the second switches 41 and 42, respectively. Herein, it is assumed that the first switch 41 is in the active state and the second switch 42 in the waiting state. Under such an assumption, if the second shelf manager 101-2 becomes activated, the manager cannot access the second shelf manager 101-2, which is in the active state, through the first and the second switches 41 and 42 of the base interfaces 405 and 406 from the external network.

This is because the first switch 41 in the active state is connected to the first shelf manager 101-1 in the waiting state, and the second shelf manager 101-2 in the active state is connected to the second switch 42 in the waiting state. Therefore, the manager controls a system through the first switch 41 in the active state and such a control message cannot be connected to the second shelf manager 101-2 in the active state.

In FIG. 4 a solid line denotes that the connection is established, and a dotted line denotes that the connection is not established.

Such an operation is identically observed when the second switch 32 is not included.

There are many studies in progress to duplicate the Ethernet port of the shelf manager in order to overcome such a drawback. Therefore, a Shroff structure for ATCA system was introduced. In the Shroff structure, a stable duplication is embodied by connecting each Ethernet port of a shelf manager to an external hub or a switch without using a base interface (Shmc) of a switch. However, four Ethernet cables must be connected to the hub or the switch of the external network for duplicating a switch of base interface and for duplicating an Ethernet port of a shelf manager. Such a connection structure, which connects four Ethernet ports for one system, is not attractive to a communication system provider.

As another alternative, a method of connecting a redundant Ethernet port to the base interface of a switch was introduced. That is, a base interface of a switch and Ethernet ports Eth0 and Eth1 of a shelf manager having a duplicated structure are connected through a backplane.

FIG. 5 is a block diagram showing an Ethernet port connection between shelf managers and two switches in an ATCA system according to a second embodiment of the related art.

An Intel ATCA system has the Ethernet port connection structure shown in FIG. 5. Differently from the Ethernet port connections shown in FIGS. 3 and 4, the first shelf manager 101-1 and the second shelf manager 101-2 are not connected together.

That is, Ethernet ports Eth0 and Eth1 of first and second shelf managers 101-1 and 101-2 having a duplicate structure are connected to one another using base interfaces 505 and 506 of a first switch 51 and a second switch 52, which are dedicated for a shelf manager.

Therefore, the first Ethernet ports 501 and 504 of the shelf managers 101-1 and 101-2 are connected to the shelf manager dedicated base interfaces 505 and 506 of the first and the second switch 51 and 52, and the second Ethernet ports 502 and 503 are connected to the redundant base interfaces 509 and 510 of the first and the second switches 51 and 52. Accordingly, the external manager can access the first shelf manger 101-1 in the active state although one of the first and the second switch 51 and 52 is in the waiting state and is not included.

In FIG. 5, a solid line denotes that the connection is established, and a dotted line denotes that the connection is not established. Therefore, the first switch 51 and the second switch 52 are connected to the active one of the first shelf manager 101-1 and the second shelf manager 101-2 having the duplicate structure in any case.

However, the connection structure shown in FIG. 5 requires Ethernet functions for accessing of a manager and Ethernet functions for duplicating the shelf managers according to a system state. Also, the connection structure of FIG. 5 requires a data back plane having a unique structure which is different from the others. Furthermore, a switch board of a switch slot must have a redundant base interface port for the Ethernet port of the shelf manager.

SUMMARY OF THE INVENTION

Accordingly, the present invention is directed to an apparatus of providing a shelf manager for duplicating an Ethernet port in ATCA system that substantially obviates one or more problems due to limitations and disadvantages of the related art.

An object of the present invention is to provide an apparatus of providing duplicate shelf managers in an ATCA system for allowing a manager to access the duplicated shelf manager all the time while maintaining the structure of the data backplane structure defined at the ATCA communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for providing duplicated shelf managers in an ATCA (advanced telecom computing architecture) includes: duplicated two shelf managers each having two Ethernet ports to connect one another for managing and controlling boards embedded in the ATCA system; two switches each having a plurality of Ethernet ports for providing a path of transmitting high-speed data to boards embedded in the ATCA system; and a hub/switch for connecting Ethernet ports of the duplicated two shelf managers and Ethernet ports of the two switches at the same time, and connecting the two shelf managers and the two switches to the Internet.

According to an aspect of the present invention, there is provided an apparatus of providing duplicated shelf managers in an ATCA (advanced telecom computing architecture), the apparatus including: a first switch and a second switch each having a plurality of Ethernet ports for providing a path of transmitting high-speed data to boards embedded in the ATCA system; a first shelf manager for managing and controlling boards embedded in the ATCA system, wherein the first shelf manager includes a first Ethernet port and a second Ethernet port for connection and a first hub/switch for connecting the first Ethernet port and an Ethernet port of the first switch; and a second shelf manager for managing and controlling boards embedded in the ATCA system, wherein the second shelf manager includes a first Ethernet port and a second Ethernet port for connection and a second hub/switch for connecting the first Ethernet port and an Ethernet port of the second switch and connecting to the first hub/switch at the same time.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
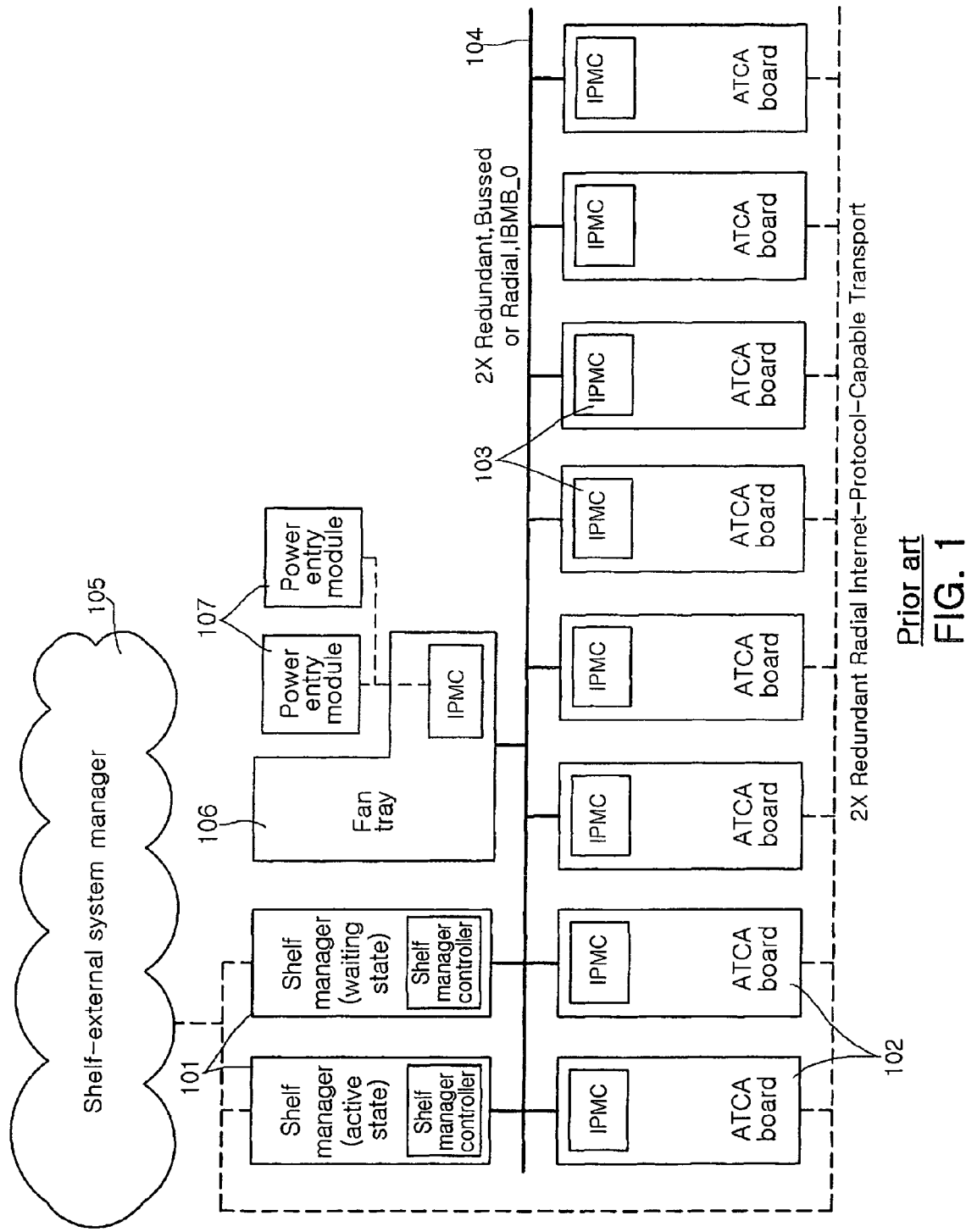
FIG. 1 is a block diagram illustrating a structure of managing systems based on ATCA according to the related art.
Figure 2:
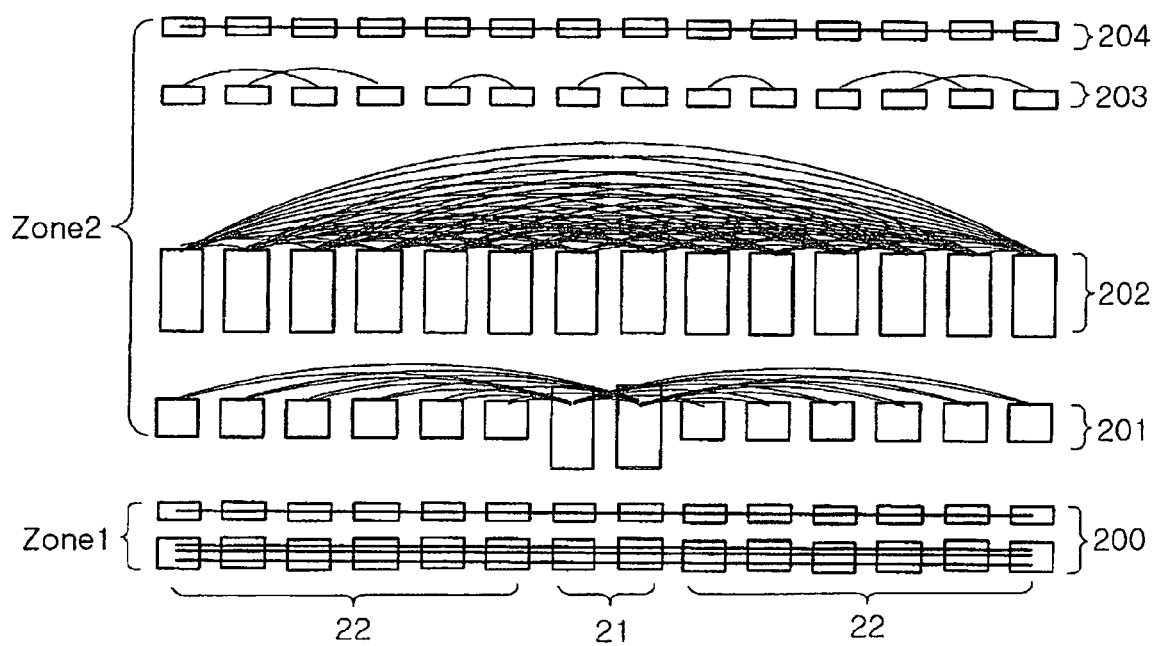
FIG. 2 is a view for describing a topology of backplane specifications of a general ATCA.
Figure 3:
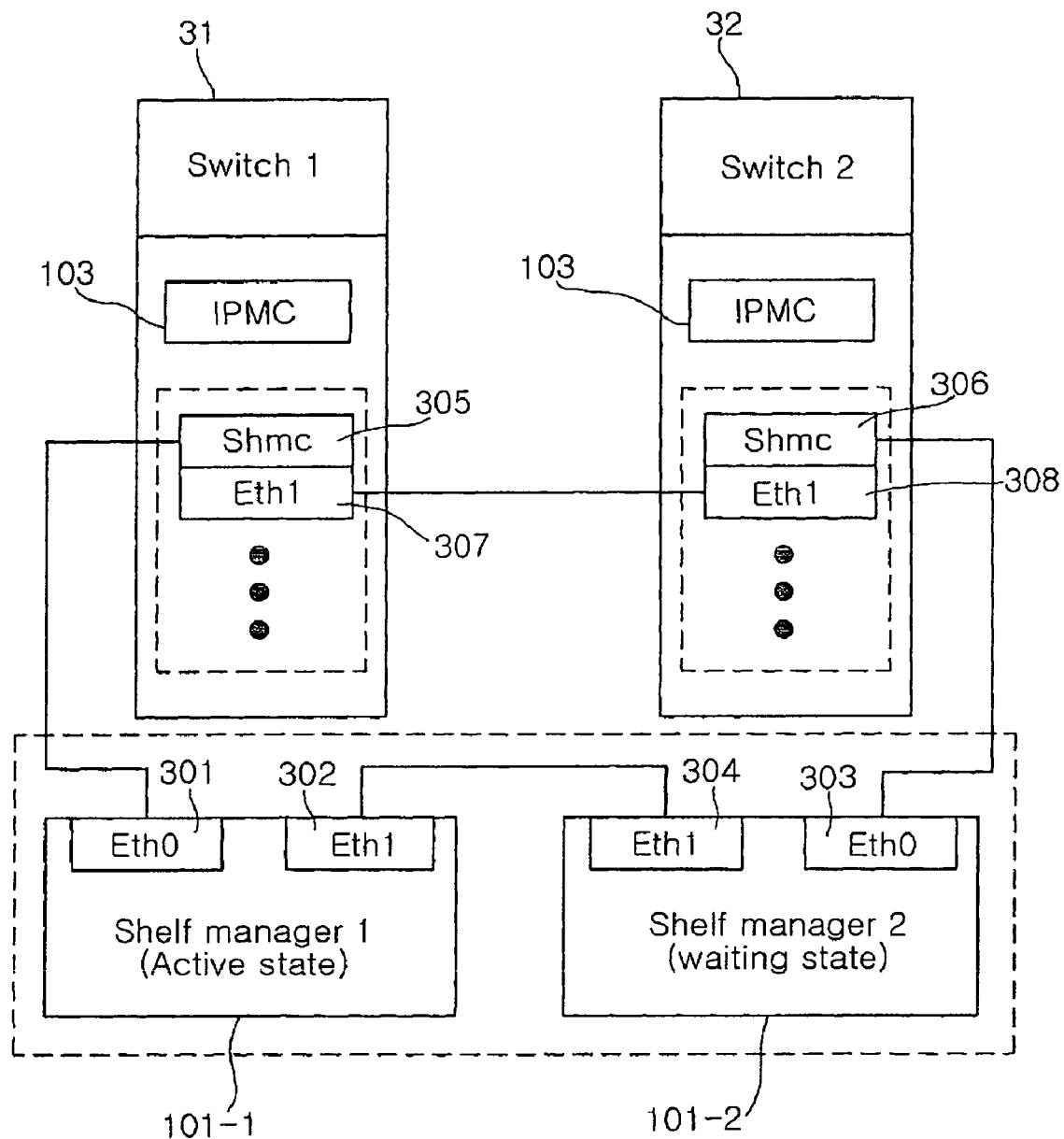
FIG. 3 is a block diagram showing an Ethernet port connection between shelf managers and two switch boards in a switch slot (21) in a conventional ATCA system according to a first embodiment of the related art.
Figure 4:
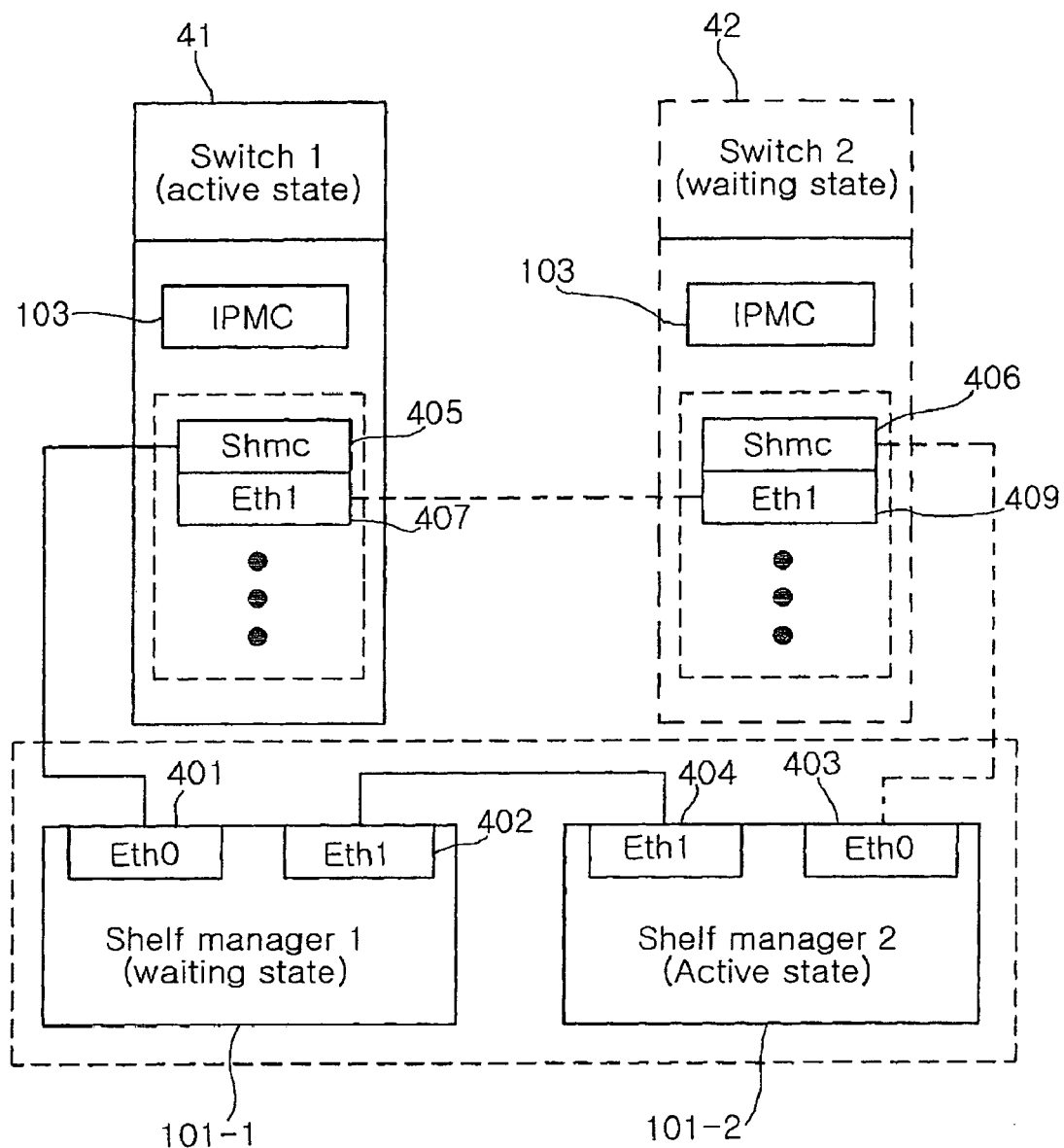
FIG. 4 is a block diagram showing an Ethernet connection between shelf managers and two switch boards in a switch slot 21 according to the first embodiment when a manager cannot access the shelf manager.
Figure 5:
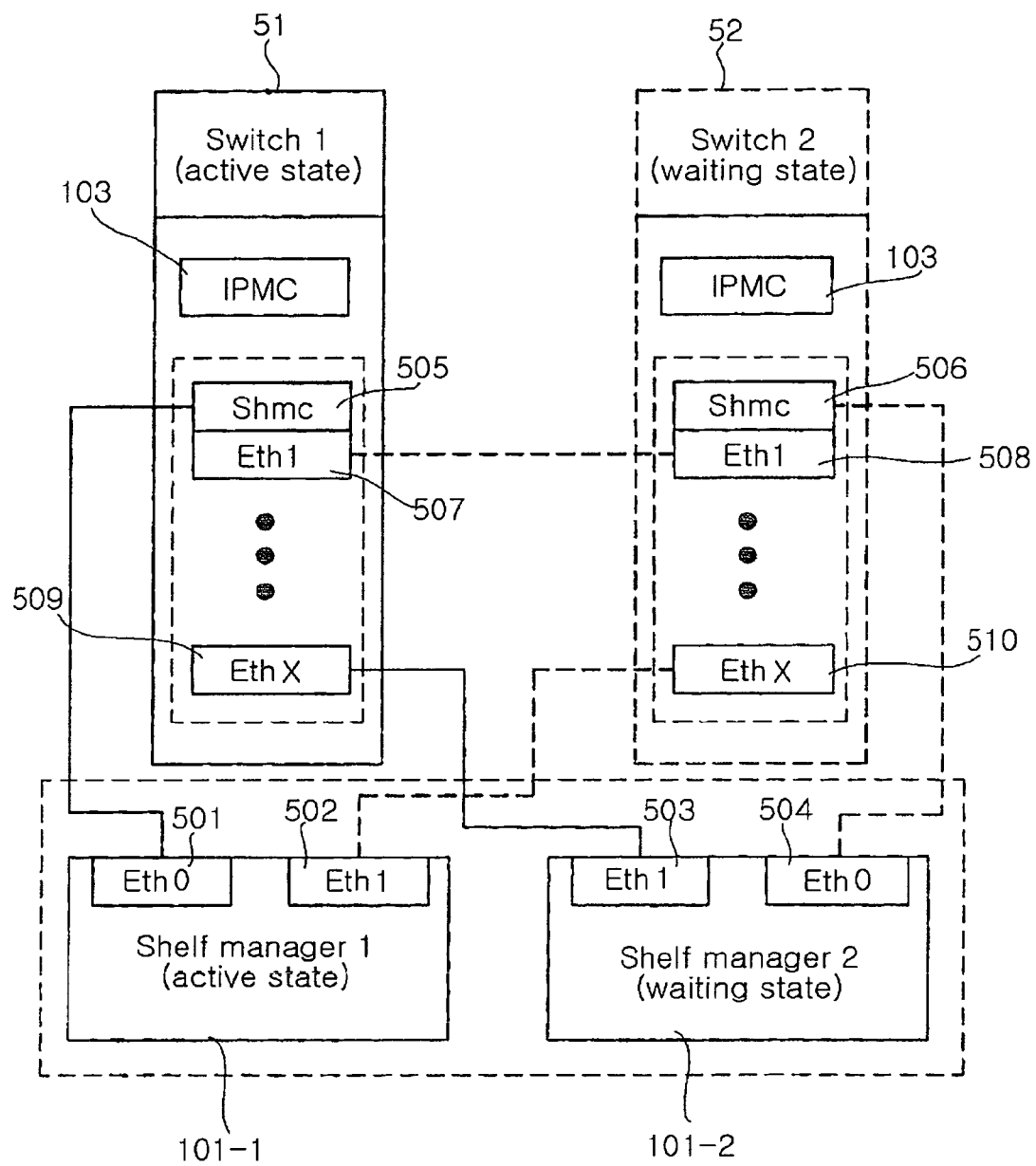
FIG. 5 is a block diagram showing an Ethernet port connection between shelf managers and two switches in an ATCA system according a second embodiment of the related art.
Figure 6:
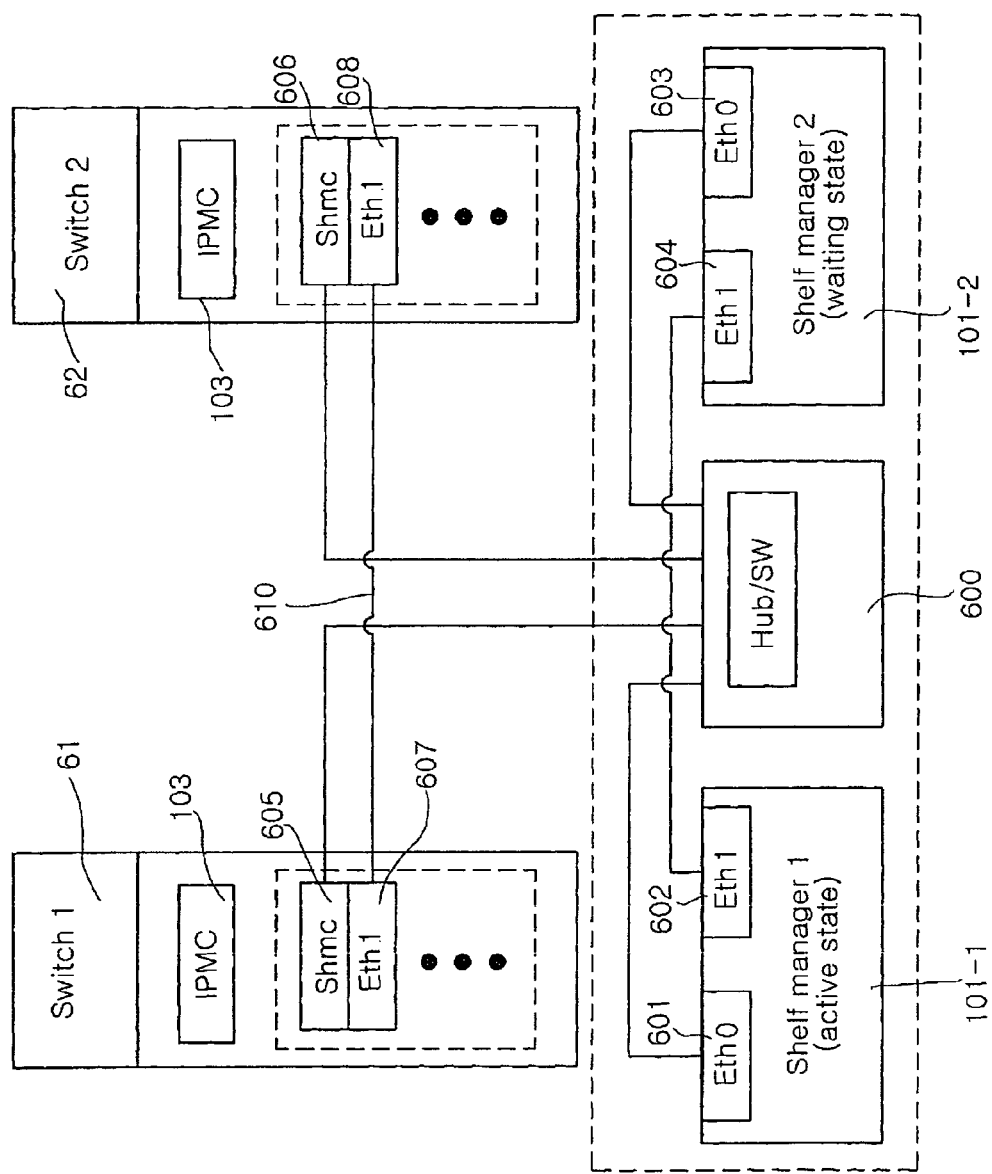
FIG. 6 is a block diagram illustrating an apparatus of providing duplicated shelf managers in an ATCA system according to an embodiment of the present invention.

FIG. 6 is a block diagram illustrating an apparatus of providing duplicate shelf managers in an ATCA system according to an embodiment of the present invention.

Referring to FIG. 6, the duplicated shelf manager providing apparatus according to the present embodiment includes: a first shelf manager 101-1 and a second shelf manager 101-2 which are duplicates; a first switch 61 and a second switch 62 which are configured as a hub node; and a hub/switch 600 for connecting the first and the second shelf managers 101-1 and 101-2 to the first and the second switches 61 and 62.

Each of the duplicate shelf mangers, the first shelf manager 101-1 or the second shelf manager 101-2, has a first Ethernet port 601 or 603 and a second Ethernet port 602 or 604. One of the second Ethernet ports 602 and 604 is used to connect the first shelf manager 101-1 and the second shelf manager 101-2. The first Ethernet port 601 or 603 is used to connect to the hub/switch 600. The hub/switch 600 is connected to the first base interface Shmc 605 or 606 of the first switch 61 and the second switch 62.

Therefore, the first and the second shelf managers 101-1 and 101-2 are connected to the first and the second switches 61 and 62 through the hub/switch 600, respectively.

In the connection structure shown in FIG. 6, the hub/switch 600 is included in an additional board that provides an alarm function by changing the structure of a control backplane while maintaining the structure of the first and the second switches 61 and 62 which configure the data backplane of the ATCA system. Therefore, the base interfaces 605 and 606 of the first switch 61 and the second switch 62 are connected to the first Ethernet ports 601 and 603 of the first and the second shelf managers 101-1 and 101-2 through the hub/switch 600.

Therefore, the shown structure allows the manager to access the activated shelf manager irrespective of the interfaces of the switches. However, an Ethernet loop may be created due to the additional path between the first switch 61 and the second switch 62 which is formed by the typical connection between the base interfaces of the first and the second switches 61 and 62 and the adding of the hub/switch 600.

Accordingly, a spanning tree protocol is used at each switch processor to prevent the loop of L2 level. It is the simplest and the most suitable method. However, the IPMC may also be used to overcome the loop problem.

In the IPMC method, the duplicate switches, the first switch 61 and the second switch 62, transmit their own operating mode information (activation or waiting) to the IPMC 103 through a hardware pin or a serial communication when one of the switches is selected to operate through an IPC. Then, the IPMC 103 inactivates the base interface 605 or 606 connected to the first and the second shelf managers 101-1 and 101-2 for the case of the switch operated in the waiting mode using the received operating mode information from the first and the second switches 61 and 62. Such an inactivation method may be embodied by modifying an electronic keying function defined in the ATCA. The Electronic keying function decides to activate or to inactivate corresponding interfaces based on a field replaceable unit (FRU) information of all boards in a slot for all interfaces connected through the backplane.

As described above, the Ethernet loop created by the hub/switch 600 may be eliminated by activating only the activated one of the two base interfaces 605 and 606 connected to the hub/switch 600 based on the information between the switch processor and the IPMC 103.

Figure 7:
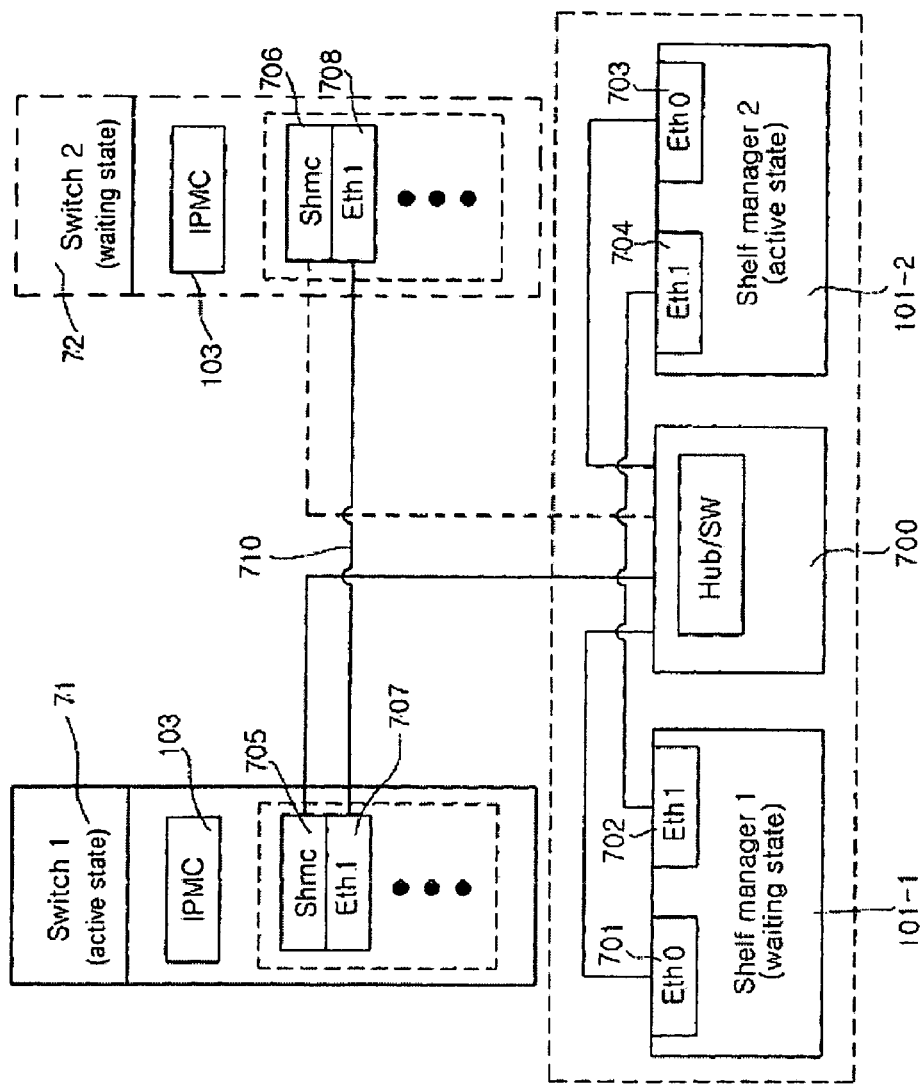
FIG. 7 is a block diagram showing the apparatus of providing duplicated shelf managers in an ACTC system according to an embodiment of the present invention when one of switches is in a waiting mode.

FIG. 7 is a block diagram showing the apparatus of providing duplicate shelf managers in an ACTC system according to an embodiment of the present invention when one of switches is in a waiting mode. The configuration and the operations of the apparatus shown in FIG. 7 are identical to those of the apparatus shown in FIG. 6.

In FIG. 7, the base interface of the second switch 72 is not operated or is not included, and the second shelf manger 101-2 is activated.

Since the apparatus of providing duplicate shelf managers according to the present embodiment includes the hub/switch 700, a manager can access the second shelf manager that is always in the active mode through the hub/switch 700 connected to the base interface 705 of the first switch 71 although the base interface of the second switch 72 is not operated or is not included.

Figure 8:
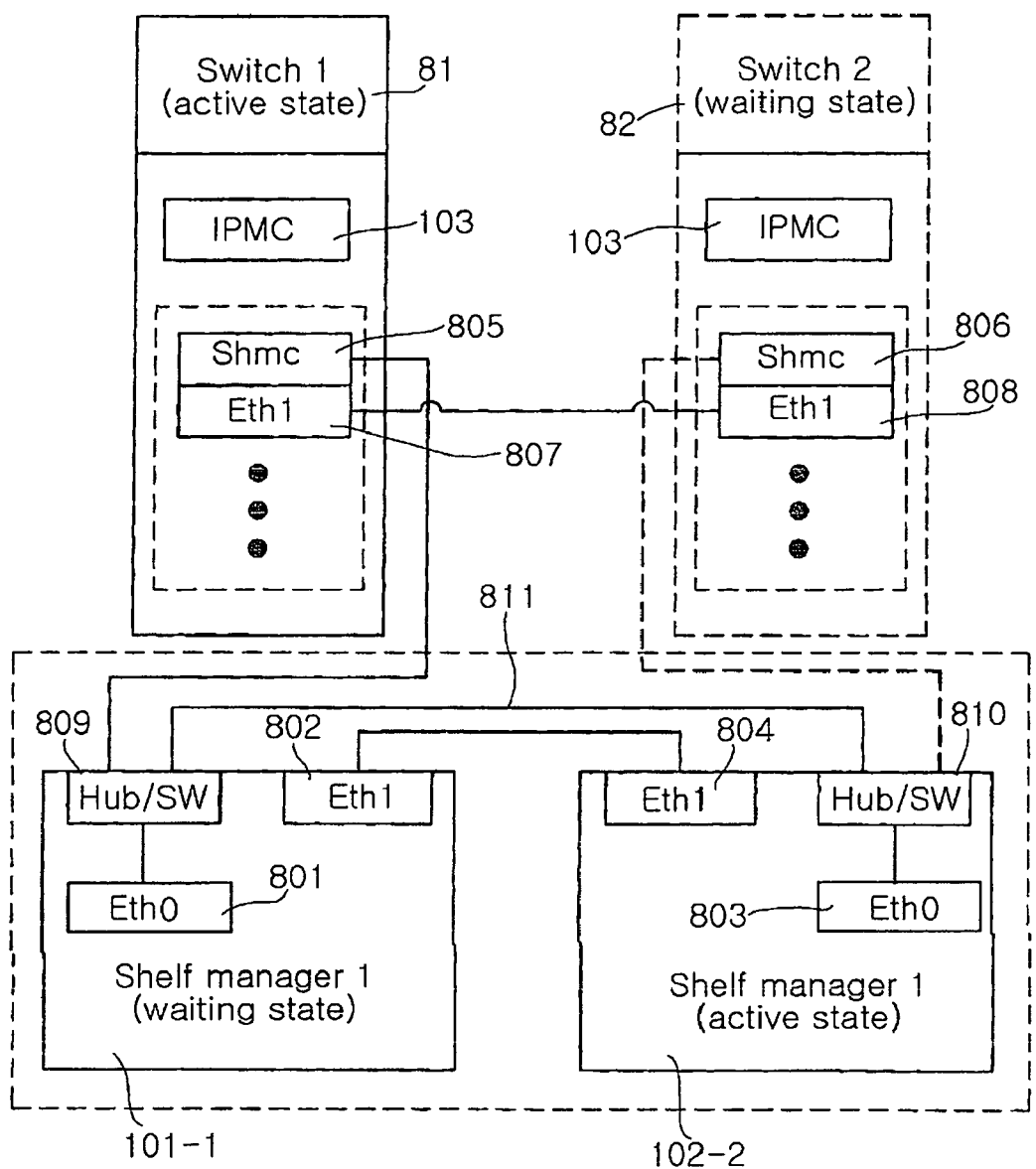
FIG. 8 is a block diagram showing an apparatus of providing duplicated shelf managers in an ATCA system according to another embodiment of the present invention.

FIG. 8 is a block diagram showing an apparatus of providing duplicate shelf managers in an ATCA system according to another embodiment of the present invention.

Referring to FIG. 8, each of the first and the second shelf managers 101-1 and 101-2 includes a hub/switch 600. Such a structure may be embodied when there is no space in the control backplane to include the hub/switch or when the additional alarm function is not used. As shown, the control backplane is only modified while maintaining the typical data backplane.

Referring to FIG. 8, the hub/switches 809 or 810 of the first and the second shelf managers 101-1 and 101-2 are connected to the base interfaces 805 and 806 of the first and the second switches 81 and 82, respectively. Also, the hub/switch 809 and 810 of the first and the second shelf managers 101-1 and 101-2 are also connected to one another.

Then redundant Ethernet ports of the hub/switches 809 and 810 are connected to the first Ethernet ports 801 and 803 of the shelf mangers. Therefore, the manager can always access the activated shelf manager.

For example, although the base interface of the second switch 82 is in the waiting mode or the second switch 82 is not included, the manager can access the Ethernet port 803 of the second shelf manager 101-2, which is in the active mode, through the hub/switch 809 of the first shelf manager 101-1 connected to the base interface 805 of the first switch 81 and the hub/switch 810 of the second shelf manger 101-2.

As described above, the duplication of the Ethernet port of the first and the second shelf managers 101-1 and 101-2 can be perfectly supported by adding the hub/switches 809 and 810 supporting three Ethernet ports at the first and the second shelf managers 101-1 and 101-2 without adding additional boards.

In the system having the first switch 81 and the second switch 82 in active mode all the time, the Ethernet loop may be generated by the connection of typical base interfaces, i.e., between base interfaces 807 and 808, between the first switch 81 and the second switch 82 and adding of the hub/switches 809 and 810. As described above, such an Ethernet loop may be eliminated by using the spanning tree protocol (STP) or the electronic keying of IPMC to use only the activated one of the base interfaces of the activated switches. Since those methods for eliminating the Ethernet loop are already described, details thereof are omitted.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

As described above, the apparatus for providing duplicate shelf managers according to the present invention allows a manager to access the duplicate shelf managers all the time from an external network by adding the hub/switch into the control backplane while maintaining the switch configuration defined of the ATCA specification.

Also, stable system duplication can be achieved by adding simple function to the ATCA system without requiring high cost according to the present invention.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for providing duplicate shelf managers in an ATCA (advanced telecom computing architecture) system, the apparatus comprising:

first and second duplicate shelf managers each having two Ethernet ports for facilitating connection, directly or via a hub/switch, between the first and second duplicate shelf managers, wherein the first and second duplicate shelf managers are configured to manage and control boards embedded in the ATCA system;

first and second switches provided in a switch slot of the ATCA system, the first and second switches each having a plurality of Ethernet ports and the first and second switches together being configured as a hub node for providing a path of transmitting high-speed data to the boards that are embedded in the ATCA system and managed and controlled by the first and second duplicate shelf managers, wherein the first and second duplicate shelf managers are accessed from an external network through the first and second switches; and the hub/switch for connecting the first and second duplicate shelf managers to the first and second switches using the Ethernet ports of the first and second duplicate shelf managers and, via respective base interfaces of the first and second switches, the Ethernet ports of the first and second switches such that the first and second duplicate shelf managers are connected to the first and second switches through the hub/switch, and for connecting the first and second duplicate shelf managers and the first and second switches to the Internet.

2. The apparatus of claim 1, wherein the first and second duplicate shelf managers and the hub/switch are embedded in a control backplane.

3. The apparatus of claim 1, wherein a first Ethernet port of the two Ethernet ports in each of the first and second duplicate shelf managers is used to connect to the hub/switch, the hub/switch is connected to the respective base interfaces of the first and second switches, and a second Ethernet port of the two Ethernet ports of the first shelf manager is connected to a second Ethernet port of the two Ethernet ports of the second shelf manager for duplicated connection between the duplicate shelf managers.

4. The apparatus of claim 3, wherein the first and second switches use an STP (spanning tree protocol) to prevent L2 level Ethernet loop.

5. The apparatus of claim 3, wherein the first and second switches prevent an Ethernet loop by activating the base interface of an activated switch, being one of the first and second switches, according to operating mode information of each of the first and second switches through an IPMC (intelligent platform management controller).

6. The apparatus of claim 5, wherein an electronic keying function of the ATCA system is used to activate the base interface of the activated switch, being one of the first and second switches.

7. An apparatus of providing duplicate shelf managers in an ATCA (advanced telecom computing architecture) system, the apparatus comprising:

a first switch and a second switch provided in a switch slot of the ATCA system, the first and second switches each having a plurality of Ethernet ports and the first and second switches together being configured as a hub node for providing a path of transmitting high-speed data to boards embedded in the ATCA system;

a first shelf manager for managing and controlling the boards embedded in the ATCA system, wherein the first shelf manager includes a first Ethernet port and a second Ethernet port for connection and a first hub/switch for facilitating connecting the first Ethernet port and an Ethernet port of the first switch via a base interface of the first switch; and a second shelf manager for managing and controlling the boards embedded in the ATCA system, wherein the second shelf manager includes a first Ethernet port and a second Ethernet port for connection and a second hub/switch for connecting the first Ethernet port and an Ethernet port of the second switch via a base interface of the second switch and connecting to the first hub/switch at the same time, wherein the first and second duplicate shelf managers are accessed from an external network through the first and second switches.

8. The apparatus of claim 7, wherein the first shelf manager and the second shelf manager are connected through the first hub/switch connected to the first Ethernet port of the first shelf manager and the second hub/switch connected to the first Ethernet port of the second shelf manager, and the first shelf manager and the second shelf manager are also connected through the second Ethernet port of the first shelf manager and the second Ethernet port of the second shelf manager to duplicate the connection between the first shelf manager and the second shelf manager.

9. The apparatus of claim 8, wherein the first switch and the second switch use an STP (spanning tree protocol) to prevent a L2 level Ethernet loop.

10. The apparatus of claim 8, wherein the first switch and the second switch prevent Ethernet loop by activating a base interface of an activated switch, being one of the first and second switches, according to an operating mode of each switch through an IPMC (intelligent protocol management controller).

11. The apparatus of claim 10, wherein an electronic keying function of the ATCA system is used to activate the base interface of the activated switch, being one of the first and second switches.

* * * * *